United States Patent
Menke et al.

(10) Patent No.: US 10,427,881 B2
(45) Date of Patent: Oct. 1, 2019

(54) CONVEYOR CHAIN MODULE

(71) Applicant: Rexnord FlatTop Europe B.V., 's-Gravenzande (NL)

(72) Inventors: Cornelis Hendrik Mijndert Menke, 's-Gravenzande (NL); Franciscus Maria Bal, 's-Gravenzande (NL); Leonardus Adrianus Catharinus Cornelissen, 's-Gravenzande (NL)

(73) Assignee: Rexnord FlatTop Europe B.V., 's-Gravenzande (NL)

( * ) Notice: Subject to any disclaimer, the term of this patent is extended or adjusted under 35 U.S.C. 154(b) by 328 days.

(21) Appl. No.: 15/102,789

(22) PCT Filed: Dec. 9, 2014

(86) PCT No.: PCT/NL2014/050841
§ 371 (c)(1),
(2) Date: Jun. 8, 2016

(87) PCT Pub. No.: WO2015/088335
PCT Pub. Date: Jun. 18, 2015

(65) Prior Publication Data
US 2018/0162647 A1    Jun. 14, 2018

(30) Foreign Application Priority Data
Dec. 10, 2013  (NL) .................................. 2011933

(51) Int. Cl.
*B65G 17/08*  (2006.01)
*B21D 51/26*  (2006.01)
(Continued)

(52) U.S. Cl.
CPC ....... *B65G 17/086* (2013.01); *B21D 51/2615* (2013.01); *B65G 17/08* (2013.01);
(Continued)

(58) Field of Classification Search
CPC .................. B65G 43/02; B65G 17/08
(Continued)

(56) References Cited

U.S. PATENT DOCUMENTS 3,319,765 A * 5/1967 Hasenwinkle ........... B27D 1/04
                                                  156/362
4,676,368 A * 6/1987 Damkjar ................ B65G 17/08
                                                  198/852
(Continued)

FOREIGN PATENT DOCUMENTS

CN        1997574 A     7/2007
CN     101282895 A     10/2008
(Continued)

OTHER PUBLICATIONS

State Intellectual Property Office, P.R. China, First Office Action and Search Report, Application No. 201480067415.9, Jun. 21, 2017.
(Continued)

*Primary Examiner* — Gene O Crawford
*Assistant Examiner* — Lester III Rushin
(74) *Attorney, Agent, or Firm* — Quarles & Brady LLP

(57) ABSTRACT

Coupling of conveyor belt modules A module (2) for a modular conveyor chain, comprising a link portion (3) made of sheet metal that includes a substantially elongate conveying body (4), the conveying body having a central hinge loop (5A) on one longitudinal side thereof and a pair of offset hinge loops (5B) on an opposite longitudinal side thereof that are interspaced to receive the central hinge loop of a link portion of a consecutive module therebetween. The central hinge loop and/or or the offset hinge loops are distanced with their free end(s) from a bottom face of the conveying body to form a through pass aperture (16) through which a hinge pin (12) held in the hinge receiving space(s) of the hinge
(Continued)

loops of other module may pass transversely to its axis into or out of its hinge receiving space.

20 Claims, 4 Drawing Sheets

(51) Int. Cl.
  *B65G 17/32* (2006.01)
  *B65G 17/40* (2006.01)
(52) U.S. Cl.
  CPC ........... *B65G 17/326* (2013.01); *B65G 17/40* (2013.01); *B65G 2201/0244* (2013.01); *B65G 2207/12* (2013.01)
(58) Field of Classification Search
  USPC ........................................................ 198/853
  See application file for complete search history.

(56) References Cited

U.S. PATENT DOCUMENTS

| 9,550,628 | B2 * | 1/2017 | Wunsch | ................. B65G 17/08 |
| 2004/0244177 | A1 * | 12/2004 | Hartman | .............. B65G 17/086 29/434 |

FOREIGN PATENT DOCUMENTS

| GB | 325 929 | 3/1930 |
| JP | S5271072 A | 6/1977 |
| WO | 2006/022659 | 3/2006 |

OTHER PUBLICATIONS

International Search Report dated Feb. 25, 2015 for International Application No. PCT/NL2014/050841.

* cited by examiner

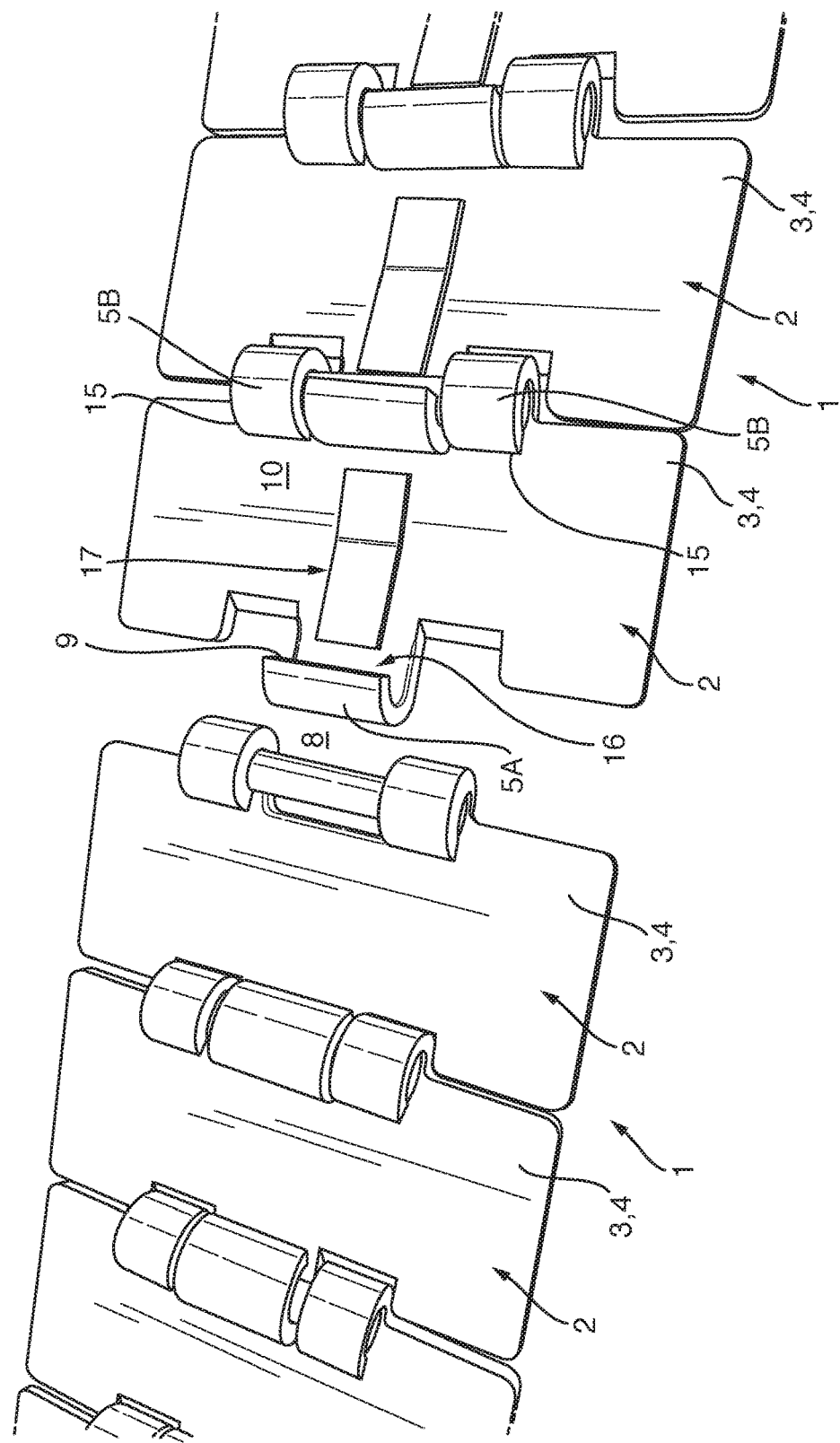

CONVEYOR CHAIN MODULE

CROSS-REFERENCE TO RELATED APPLICATIONS

This application represents the national stage entry of PCT International Application No. PCT/NL2014/050841 filed on Dec. 9, 2014 and is based upon and claims the benefit of priority from Dutch Patent Application No. 2011933, filed on Dec. 10, 2013, the entire contents of all of which are incorporated herein by reference.

The invention generally relates to sheet metal modular conveyor chains, and in particular to coupling of modules of such chains.

Sheet metal modular conveyor chains are well known, and are commonly used to transport products, for example bottles, through manufacturing plants.

The known conveyor chains include a large number of consecutive sheet metal modules that are hingedly coupled via hinge pins. In use the modules of the chains are coupled to form an endless loop, that circulates between sprocket wheels of a conveyor track.

Metal conveyor chain modules have been standardized in DIN 8153/ISO 4348. The DIN 8153/ISO 4348 standardization determines the sizes and dimensions of so called flat-top chain modules, e.g. the pitch between chain modules, the hinge pin diameter and e.g. how the coupling pieces of the portions of the modules need to be curled.

The modules for these conveyor chains are mass manufactured. The modules are stamped from sheet metal blanks, usually tough stainless steel. The blanks include a substantially elongate conveying body, with a central tongue extending on one longitudinal side thereof and a pair of offset tongues extending from an opposite longitudinal side thereof. During stamping, the tongues are curled to loop with their free ends back towards a bottom face of the conveying body around a hinge receiving space, and thus form hinge loops. The offset tongues are interspaced to form offset hinge loops that can receive the central hinge loop of a link portion of a consecutive module therebetween.

During manufacture, a number of modules is coupled to form a chain string. This is done by passing a hinge pin axially through aligned hinge receiving spaces of cooperating hinge loops of consecutive modules. Typically, the hinge pin has a round cross section with a diameter of about 4-8, mm in particular about 6-6.5 mm and the hinge loops are typically curved with a substantially constant radius that is slightly smaller than the diameter of the hinge pin for hinge loops that are to clampingly hold the hinge pin, i.e. the so called fixed hinge loops, and a radius that is slightly larger than the diameter of the hinge pin for hinge loops that are to hingedly hold the hinge pin, i.e. the so called hinging hinge loops.

The hinged coupling of consecutive conveyor belt modules is critical and must be simple yet extremely reliable: throughout the life of the conveyor chain, the hinge pins may not ever travel out of engagement. In practice, either the central hinge loop or the offset hinge loops are thereto made with a strong interference fit to the pin diameter, and the hinge pin is axially forced into the hinge receiving spaces, so that the pin is axially retained. The other hinge loop(s) are made with a loose fit to the pin diameter, so as to allow hinging. For reasons of handling, the chain strings usually include about 80 modules for chains with a pitch of 1.5 inch, so that their length is about 3 m.

After their manufacture, the chain strings need to be assembled into an endless conveyor chain at the location of the conveyor track. Conventionally, this is done by removing the hinge pin of the last module of a chain string, aligning the last module of the chain string with the first module of a consecutive string, and passing the pin through the cooperating hinge loops. This is continued until an endless loop can be formed with the chain in the track. Typically, the coupling is done manually with hammer and a punch. This is time consuming, an potentially unsafe manual labor. Typically, conveyors include multiple tracks of endless conveyor chains, which commonly have lengths of about 6-25 m, e.g. for running in tracks of 3-12 m.

To facilitate the coupling, it has been proposed to manufacture the chain strings with the hinge pin left out of the last chain module, and to supply the chain string with the hinge pin separate. In practice, this has lead to problems as such a separate pin tends to get lost when unpacking the chain strings during assembly of the conveyor belt.

The invention aims to facilitate coupling of conveyor modules, without the above mentioned drawback, and without compromising the reliability of the coupling. Thereto, the invention provides for a module for a modular conveyor chain, comprising a link portion made of sheet metal that includes a substantially elongate conveying body, the conveying body having a central hinge loop on one longitudinal side thereof and a pair of offset hinge loops on an opposite longitudinal side thereof that are interspaced to receive the central hinge loop of a link portion of a consecutive module therebetween, wherein the hinge loops extend from the conveying body and loop with their free ends back towards a bottom face of the conveying body around a hinge receiving space, so that consecutive modules can be hingedly coupled by a hinge pin passing axially through aligned hinge receiving spaces of their cooperating hinge loops, wherein the central hinge loop and/or or the offset hinge loops are distanced with their free end(s) from a bottom face of the conveying body to form a through pass aperture through which a hinge pin held in the hinge receiving space(s) of the hinge loops of other module may pass substantially transversely to its axis into or out of its hinge receiving space.

By providing a through pass aperture, a hinge pin held in the central or offset hinge loops may enter the hinge loop substantially transversely to its axis, so that coupling may be facilitated. The modules may be coupled by holding consecutive chain at a coupling angle that is sharper than the normal maximum operating angle that they would include in the chain, hooking the hinge loop(s) defining the pass through aperture(s) beyond the exposed hinge pin held in hinge loops of the consecutive module, and subsequently returning the consecutive modules to include their normal maximal operating angle or less. In use, the tension on the modular may be used to keep the modules from disengaging. The coupling angle may e.g. range between 80 and 150 deg, and is preferably about 120 to 140 deg. The normal operating angle includes by consecutive modules occurs while rounding a sprocket wheel, and is e.g. about 145.

The modules may be formed as conventional chain modules, and the central hinge loops and/or offset hinge loops may be machined to have their free ends distanced further from the bottom face of the conveying body to define the pass through opening, e.g. by a milling or cutting operation. Alternatively, the modules may be formed from blanks having shortened tongues to have their free ends distanced further from the bottom face of the conveying body, e.g. the tongues for the central hinge loop being shorter than the tongues for the offset hinge loops. In addition, the free ends of the hinge loops may be formed to have less curvature or to be straight, or may be bent back after manufacture to have their free ends distanced further from the bottom face of the conveying body. Further, the hinge loops may have a partial tubular shape of which a central axis extends parallel to the longitudinal side of the conveying body. Further, the hinge loops may extend forwardly and outwardly from the conveying body. In addition, the length of the hinge loop having the partial tubular shape, extending parallel to the longitudinal side may be greater than the thickness of e.g. the conveying body. Typically, the free end of the hinge loop defines a pass trough opening of about the same size of the diameter of the hinge pin to allow transverse passage of a conventional hinge pin, e.g. about 4-8 mm, and in particular about 6-6.5 mm. Very specifically, the opening may be sized to allow passage of a standard cylindrical hinge pin of 6.35 mm The passage may be slightly smaller in case the hinge pin can be forced through, e.g. by elastically deforming the free end of the hinge loop. Also, the passage may be slightly smaller in case of a hinge pin that has a non circular cross section, locally or along its full length, e.g. a D-pin or a pin with D shaped cross sectional ends.

This way, with a minimum of adaptation to a standard module, a module can be provided that facilitates coupling. A module that includes central or offset hinge loops with pass through openings may be coupled to a standard chain module, and may hold its own hinge pin. A module that includes central and offset hinge loops with pass through openings may be coupled to standard modules on both lateral sides, and may not hold its own hinge pin.

The chain module of the invention may be designed as a straight running or curve going module, and may be included in a straight running or curve going chain, e.g. of the design defined in DIN 8153/ISO 4348. The chain module of the invention may further not only be of the single hinged design as discussed, but may also include further hinge loops, and may in particular also be of the double hinge design. In such a design, the free ends of further hinge loops on a lateral side of which a hinge loops define a through pass aperture should also define a through pass aperture.

The conveying body typically includes longitudinally outwardly extending wing portions, of which the bottom faces slide on wear strips of the conveyor track. In use, the assembly of hinge loops is guided between the wear strips. The top face of the conveying body forms a transport surface for transporting products thereon. The top face is typically substantially flat and closed, but may be provided with through holes, or texture such as rubber pads. It should be noted that within the context of this patent application, a module that comprises a link portion made of sheet metal may still include other materials thereto, e.g. a fused plastic or rubber part of the conveying surface that is attached to or integrally formed with the metal part of the link portion.

The other than the central hinge loop or the offset hinge loops may be arranged to be distanced with their free end(s) from the bottom face of the conveying body to form a blocking skirt through which a hinge pin held in the hinge receiving space(s) of the hinge loops of other module may not pass substantially transversely to its axis into or out of its hinge receiving space. This way, the module may hold its own hinge pin. The hinge loop(s) that form a blocking skirt may axially fixedly hold a hinge pin via clamping engagement and/or a frictional fit. To enhance fixation, the hinge pin may be locally provided with a rough surface to enhance friction, e.g. a knurled surface.

To further increase reliability of the coupling, the module may comprises a retainer facing the through pass aperture(s) which blocks a hinge pin held in the hinge receiving space(s) of the hinge loops of other module and held in the hinge receiving space(s) from passing substantially transversely to its axis out of its hinge receiving space. To keep coupling simple, the retainer may be configured to allow a hinge pin held in the hinge receiving space(s) of the hinge loops of other module to pass substantially transversely to its axis into its associated hinge receiving space.

The retainer may be embodied as an auxiliary element. Alternatively, it may be integrally formed with conveying body, e.g. as a punched lip. In case the retainer is embodied as auxiliary element, it may e.g. be configured as a detachable clip, for example made of plastic or steel.

The retainer may include a spring element. Thus way, its ease of operation and/or reliability may be enhanced. Elegantly, the spring element may include a resilient lip, preferably made from spring steel. As an alternative, the spring element may include a plastic lip. Such lips may be arranged to provide an audible click upon passage of the hinge pin to signal secure connection, and may be arranged as a non-return element.

The retainer may be fixedly mounted to the conveying body, e.g. by welding, molding or gluing to enhance reliability. As an alternative, the retainer may be detachably mounted.

Preferably, the retainer is made of spring steel and is spot welded with a foot portion to the link portion at the bottom face of the conveying body, opposite a hinge loop defining a through pass zone. A lip portion of the retainer may extend upwards toward the free end of the hinge loop into the trough pass aperture. During coupling, a hinge pin may depress the lip portion so it may freely enter the hinge receiving space. The upwardly extending lip portion however acts as a blocking element that prevents free exit of the hinge pin from the hinge receiving space via the through pass aperture until it is depressed manually or with a standard tool. Preferably the lip portion extends towards the centerline of the hinge pin, so that it may be loaded in its longitudinal direction.

The free end of the hinge loop(s) that define the though pass aperture may be positioned between a quarter and three quarter circle position starting from the longitudinal side. Preferably, it is located at about the half circle position. By looping the hinge loop through at least 45 degrees a coupling may be achieved that may fully transfer tensile force. By looping the hinge loop through 225 degrees or less, hooking the hinge loop behind a hinge pin may be facilitated, and the pass through aperture may be made sufficiently large. By looping the hinge loop through about 180 degrees, preferably slightly less, e.g. 160-180 degrees, the transfer of tensile force via the hinge loop may be the same as though a conventional hinge loop, while the relatively short hinge loop may be hooked behind a hinge pin very easily.

The longitudinal side of the conveying body may at least at the bottom face be provided with cutaway portions for accommodating base portions of the hinge loops of the consecutive module during coupling. This may facilitate hooking the hinge loop behind a hinge pin during coupling.

The invention further relates to a modular conveyor chain string, comprising a number of consecutive modules, each comprising a link portion made of sheet metal that includes a substantially elongate conveying body, the conveying body having a central hinge loop on one longitudinal side thereof and a pair of offset hinge loops on an opposite longitudinal side thereof that are interspaced to receive the central hinge loop of a link portion of a consecutive module therebetween, wherein the hinge loops extend from the conveying body and loop with their free ends back towards a bottom face of the conveying body around a hinge receiving space, and wherein consecutive modules are hingedly coupled by a hinge pin passing axially through aligned hinge receiving spaces of their cooperating hinge loops, wherein at least one module is configured as discussed above. An end module as discussed above may be configured so as to act as a coupling module for coupling a further string; the further modules in the string may be provided with hinge loops that are all distanced with their free ends from the bottom face of the conveying body to form a blocking skirt through which a hinge pin held in the hinge receiving spaces of the hinge loops of other module may not pass substantially transversely to its axis into or out if its hinge receiving space. The string may e.g. include a standard string of 80 conventional modules, and 1 end module configured with a through pass aperture.

The invention further relates to a conveyor, comprising a number of conveyor strings as mentioned above, coupled into an endless loop, and circulating between sprocket wheels. The sprocket wheels may be adapted to prevent engagement of a retaining element, and may in particular be provided with recesses at its circumference to prevent engagement of the spring lip.

The invention further relates to a method of coupling a chain modules as discussed above, including holding consecutive chain modules at a coupling angle, preferably one that is sharper than the normal maximum operating angle that they would include in the chain, hooking the hinge loop(s) defining the pass through aperture(s) beyond the exposed hinge pin held in hinge loops of the consecutive module, and subsequently returning the consecutive modules to include their normal maximal operating angle or less.

The invention will further be elucidated on the basis of exemplary embodiments which are represented in the drawings. The exemplary embodiments are given by way of non-limitative illustration of the invention.

In the drawings:

FIG. 5 shows a perspective view of the last module of the string of FIG. 4 and a separate conveyor chain module ready for coupling to the last module.

It is noted that the figures are only schematic representations that are given by way of a non-limiting example. In the figures, the same or corresponding parts are designated with the same reference numerals.

Figure 1:
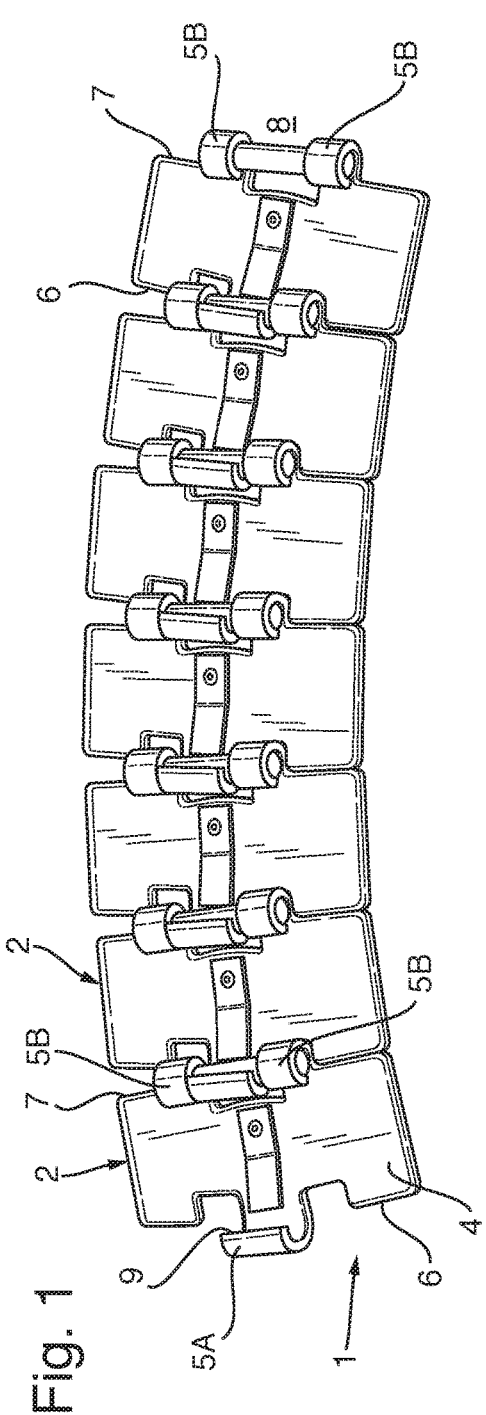
FIG. 1 shows a perspective bottom view of a string of consecutive modules of a first type of conveyor chain.

FIG. 1 shows a string 1 of hingedly coupled modules 2 of a modular conveyor chain of a first type. The modular conveyor chain string 1 comprises a number of consecutive modules 2. Each module 2 comprises a link portion 3 made of stainless steel sheet metal. The link portion includes a substantially elongate conveying body 4. The conveying body 4 has a central hinge loop 5A on one longitudinal side 6 thereof and a pair of offset hinge loops 5B on an opposite longitudinal side 7 thereof, wherein the hinge loops 5A 5B are partially tubular shaped, wherein the hinge loops 5A 5B have a central axis that extends parallel to the longitudinal side of the conveying body 4. The hinge loops 5A 5B extend forwardly and outwardly from the conveying body 4. Furthermore, the length of the hinge loop 5A and/or hinge loop 5B extending parallel to the longitudinal of the conveying body 4 side is greater than the thickness of the conveying body 4. The offset hinge loops 5B that are interspaced with an interspace 8 to receive the central hinge loop 5A of a link portion 3 of a consecutive module 2 therebetween. The hinge loops 5 extend from the conveying body and loop with their free ends 9 back towards the bottom face 10 of conveying body 4 around a hinge receiving space 11. Consecutive modules are hingedly coupled by a hinge pin 12 passing axially through aligned hinge receiving spaces 11 of their cooperating hinge loops.

The conveying body 4 includes longitudinally outwardly extending wing portions 13, of which the bottom faces in use slide on wear strips of a conveyor track. The assembly of cooperating, coupled hinge loops 5 is then guided between the wear strips. The top face 14 of the conveying body forms a transport surface for transporting products thereon. The top face 14 of this embodiment is flat and closed.

The offset hinge loops 5B are arranged to be distanced with their free ends 9 from the bottom face 10 of the conveying body 4 to form a blocking skirt 15 through which a hinge pin 12 held in the hinge receiving spaces 11 of the hinge loops 5B of a consecutive module 2 may not pass transversely to its longitudinal axis into or out if its hinge receiving space. The free ends 9 of the offset hinge loops 5B loop to more than 270 degrees starting from the longitudinal edge 7 to form a blocking skirt 15. The offset hinge loops 5B that form the blocking skirt 15 axially fixedly hold the hinge pin 12 via clamping engagement and frictional fit.

The central hinge loop 5A is distanced with its free end 9 from the bottom face 10 of the conveying body 4 to form a through pass aperture 16. Through the through pass aperture 16, the hinge pin 12 held in the hinge receiving spaces 11 of the offset hinge loops 5B of the consecutive module may pass substantially transversely to its longitudinal axis into or out of the hinge receiving space 11 of the central hinge loop 5A. The free end 9 of the central hinge loop 5A that defines the though pass aperture 16 is in this embodiment positioned at half circle position starting from the longitudinal side, i.e. at 180 degrees loop.

Figure 2:
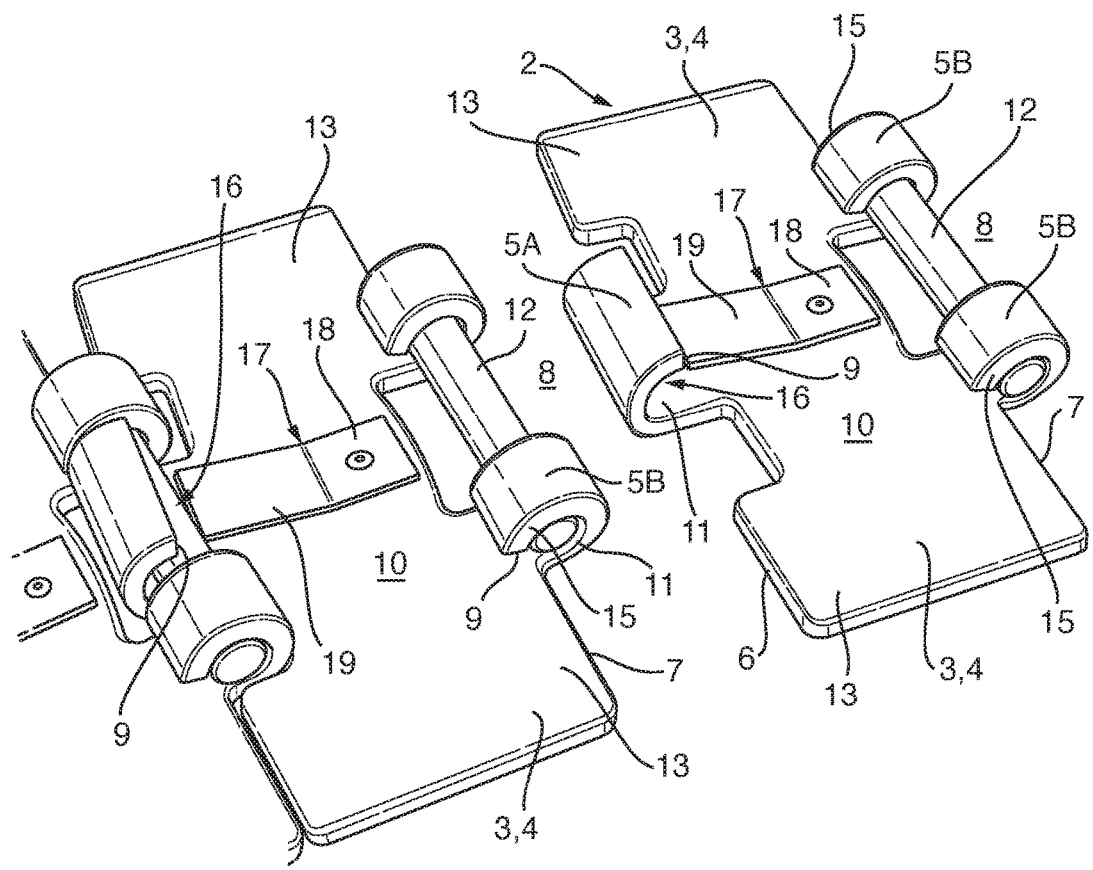
FIG. 2 shows a perspective view of the last module of the string of FIG. 1 and a separate chain module ready for coupling to the last module.

Referring to FIG. 2, the pass through aperture 16 can be seen clearly in a separate module 2' that is ready for coupling to the last module 2 on the string 1. The modules 2,2' may preferably be coupled by holding them to include a coupling angle α that is sharper than the normal maximum operating angle β that they would include in the chain, by hooking the central hinge loop 5A defining the pass through aperture 16 beyond the exposed hinge pin 12 held in hinge loops of the end module 2, and subsequently returning the consecutive modules 2,2' to include their normal maximal operating angle. In case the pass through aperture is larges, the coupling angle may be the same as the operating angle. In such case, the retaining element may prevent disengagement.

Figure 3:
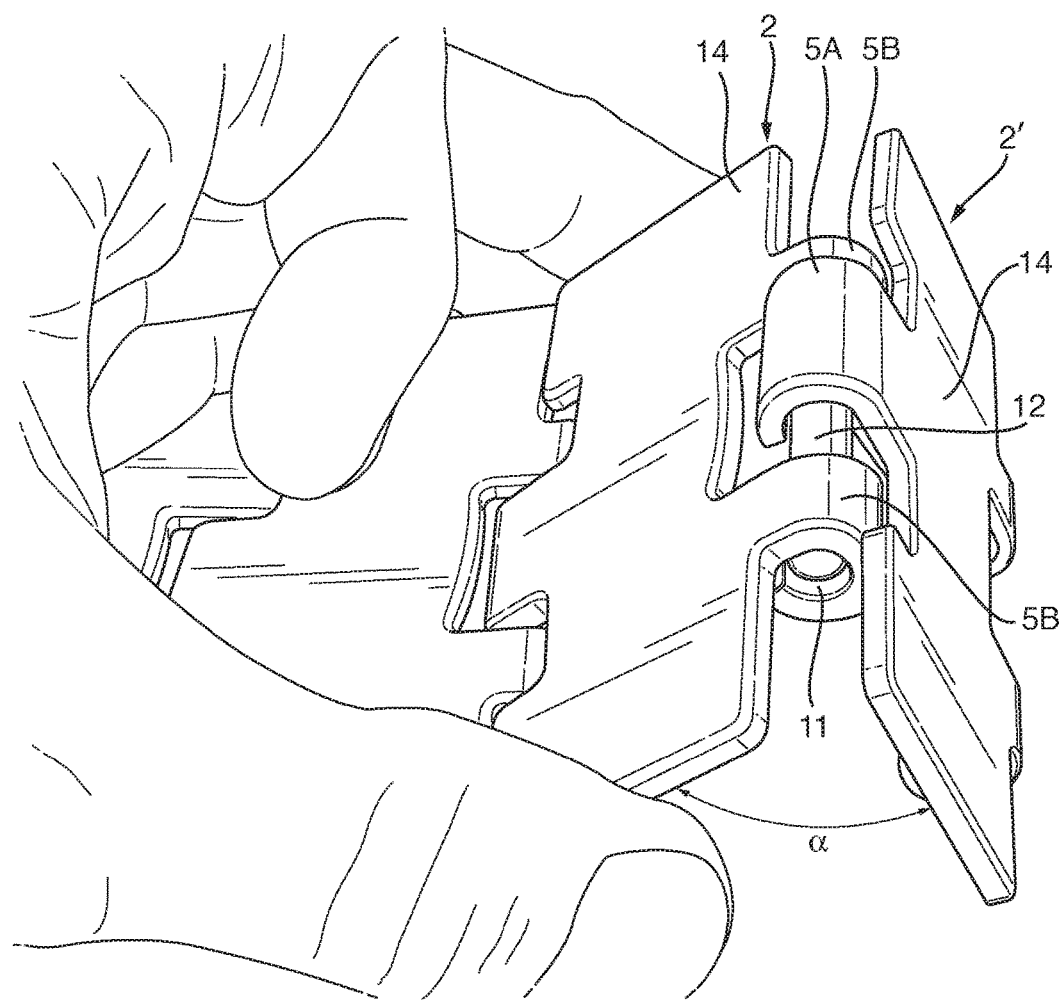
FIG. 3 shows a perspective view of the modules of FIG. 2 extending at a coupling angle during coupling.

Referring to FIG. 3, it is shown that the consecutive chain modules 2,2' include a coupling angle α of about 90 degrees, and that the central hinge 5A loop is being hooked behind the hinge pin 12 held in the offset hinge loops 5B of the consecutive module 2.

The module 2 in this exemplary embodiment comprises a retainer 17. This retainer 17 is made of spring steel and is spot welded with a foot portion 18 to the link portion 3 at the bottom face 10 of the conveying body 4, opposite the hinge loop 5A defining the through pass aperture 16. A lip portion 19 of the retainer 17 extends upwards toward the center of the hinge pin 12 of the hinge loop 5A into the trough pass aperture 16. During coupling, the hinge pin 12 depresses the lip portion 19 so it may freely enter the hinge receiving space 11. When it has been passed by the hinge pin 12 and it returns to its original position, it makes a clicking sound. The upwardly extending lip portion 19 acts as a blocking element that subsequently prevents free exit of the hinge pin 12 from the hinge receiving space 11 of the hinge loop 5A via the through pass aperture 16 until it is depressed, e.g. manually or with a tool.

The string 1 of this embodiment is made up of identical modules 2, i.e. each of the modules is provided with a central hinge loop 5A that defines a through pass aperture 16. A number of these strings 1 may de coupled into a loop, to form an endless conveyor chain for circulating between sprocket wheels of a conveyor. In the string 1, for coupling actually only one module at the end needs to be provided with a hinge loop 5A that defines a through pass aperture 16, and the further modules may be made standard, i.e. with only hinge loops 5 that form blocking skirts 15. The configuration as shown, however, facilitates increasing or decreasing the length of the chain module by module.

The chain of FIG. 1-3 is a single hinge curve going chain based on DIN 8153/ISO 4348. It is configured to not only hinge about the transversely extending hinge pins 12, but to also allow consecutive modules 2 to hinge about an axis perpendicular to a conveying plane. This is done by providing the central hinge loops 5A with an oversized curve relative to the diameter of the chain pin 12, and by providing the longitudinal edges 6 of the modules with recesses at the wing portions 13. Such oversized 'hinging' hinge loops may be curved at relatively great curvature to provide a large through pass opening, while still including an almost full loop.

Figure 4:
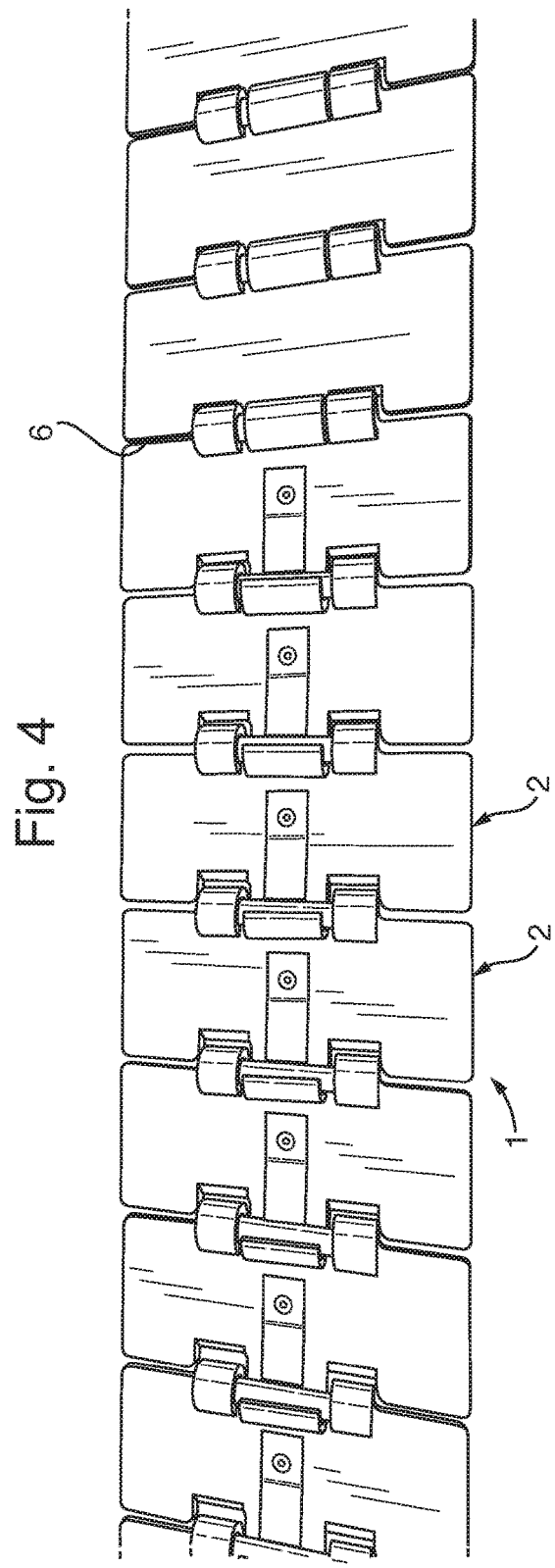
FIG. 4 shows a perspective bottom view of a string of consecutive modules of a second type of modular conveyor chain.

In FIGS. 4 and 5 a second embodiment of the conveyor chain is shown. This chain is of the straight running type, which is not configured to make curves in its plane of transport. The longitudinal edges 6 are straight at the wing portions. As can be seen, a the string 1 also includes consecutive conventional modules 2.

The invention is not limited to the embodiment described above. Many variations will be apparent to the skilled person in the art. Such variations are understood to be comprised within the scope of the invention defined in the appended claims.

LIST OF REFERENCE NUMERALS 1. string
2. module
3. link portion
4. conveying body
5. hinge loop
5A. central hinge loop
5B. offset hinge loop
6. longitudinal side
7. longitudinal side
8. interspace
9. free end
10. bottom face
11. hinge receiving space
12. hinge pin
13. wing portion
14. top face
15. blocking skirt
16. through pass aperture
17. retainer
18. foot portion
19. lip portion α. coupling angle
β. operating angle

What is claimed is:

1. A module for a modular conveyor chain, said module comprising:
   a metal link portion including a substantially elongate conveying body having opposing longitudinal sides and a bottom face;
   a central hinge loop on one longitudinal side of the conveying body; and
   a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop or each of the offset hinge loops of the pair of offset hinge loops define a distance between the hinge loop free end and the bottom face of the conveying body to form a through pass aperture through which a hinge pin having a diameter over at least a part of its length in the range between about 4 mm to about 8 mm held in a hinge receiving space of at least one hinge loop of another module may pass substantially transversely to its axis into or out of the hinge receiving space of the central hinge loop or each of the offset hinge loops of the pair of offset hinge loops.

2. The module according to claim 1, wherein a distance between the hinge loop free end of the other of the central hinge loop or each of the offset hinge loops and the bottom face of the conveying body forms a blocking skirt through which a hinge pin held in the hinge receiving space of the at least one hinge loop of the another module may not pass transversely to its axis into or out of its hinge receiving space.

3. The module according to claim 2, wherein at least one hinge loop forming the blocking skirt axially fixedly holds a hinge pin.

4. The module according to claim 1, including a retainer facing the through pass aperture that blocks a hinge pin held in the hinge receiving space of the at least one hinge loop of the another module and held in the hinge receiving space of the central hinge loop or each of the offset hinge loops of the pair of offset hinge loops from passing transversely to its axis out of the receiving space of the central hinge loop or each of the offset hinge loops of the pair of offset hinge loops.

5. The module according to claim 4, wherein the retainer allows a hinge pin held in the hinge receiving space of the hinge loops of the another module to pass transversely to its axis into its associated hinge receiving space.

6. The module according to claim 4, wherein the retainer is an auxiliary element.

7. The module according to claim 4, wherein the retainer includes a spring element.

8. The module according to claim 7, wherein the spring element is fixedly mounted to the conveying body.

9. The module according to claim 4, wherein the retainer is welded to the link portion.

10. A module for a modular conveyor chain, said module comprising:

a metal link portion including a substantially elongate conveying body having opposing longitudinal sides and a bottom face;

a central hinge loop on one longitudinal side of the conveying body; and a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop or each of the offset hinge loops of the pair of offset hinge loops define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops;

wherein the free end of the hinge loop defining the though pass aperture is positioned between approximately a quarter and three quarter circle position starting from the longitudinal side.

11. The module according to claim 1, wherein the longitudinal side of the conveying body has at least at the bottom face been provided with cutaway portions for accommodating base portions of the hinge loops of the consecutive module during coupling.

12. A modular conveyor chain string, comprising:

a number of consecutive modules, each module including a link portion made of sheet metal that includes a substantially elongate conveying body, the conveying body having a central hinge loop on one longitudinal side thereof and a pair of offset hinge loops on an opposite longitudinal side thereof that are interspaced to receive the central hinge loop of a link portion of a consecutive module therebetween, wherein the hinge loops extend from the conveying body and loop with their free ends back towards the conveying body around a hinge receiving space, and wherein consecutive modules are hingedly coupled by a hinge pin passing axially through aligned hinge receiving spaces of their cooperating hinge loops, wherein at least one module comprises:

a metal link portion including a substantially elongate conveying body having opposing longitudinal sides and a bottom face;

a central hinge loop on one longitudinal side of the conveying body; and a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop or each of the offset hinge loops of the pair of offset hinge loops define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops;

wherein an end module is configured to act as a coupling module for coupling a further string, the end module comprising:

a metal link portion including a substantially elongate conveying body having opposing longitudinal sides and a bottom face;

a central hinge loop on one longitudinal side of the conveying body; and a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop or each of the offset hinge loops of the pair of offset hinge loops define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops; and wherein the further modules in the string are provided with hinge loops that are all distanced with their free ends from the bottom face of the conveying body to form a blocking skirt through which a hinge pin held in the hinge receiving spaces of the hinge loops of other module may not pass transversely to its axis into or out of its hinge receiving space.

13. A conveyor, comprising a number of conveyor strings according to claim 12 coupled into an endless loop, and circulating between sprocket wheels.

14. A method of coupling a chain module comprising:

a metal link portion including a substantially elongate conveying body having opposing longitudinal sides and a bottom face;

a central hinge loop on one longitudinal side of the conveying body; and a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop or each of the offset hinge loops of the pair of offset hinge loops define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops, to a consecutive module wherein the other than the central hinge loop or the offset hinge loops are distanced with their free end(s) from the bottom face of the conveying body to form a blocking skirt through which a hinge pin held in the hinge receiving space(s) of the hinge loops of other module may not pass transversely to its axis into or out of its hinge receiving space, and wherein the hinge loop(s) that form a blocking skirt axially fixedly hold a hinge pin, the method comprising:

holding the consecutive chain modules at a coupling angle that is sharper than a normal maximum operating angle that they would include in the chain;

hooking at least one hinge loop defining the pass through aperture beyond an exposed hinge pin held in hinge loops of the consecutive module; and subsequently returning the consecutive modules to include the normal maximal operating angle or less.

15. A module for a modular conveyor chain, said module comprising:
a metal link portion including a substantially elongate conveying body having opposing longitudinal sides and a bottom face;
a central hinge loop on one longitudinal side of the conveying body; and
a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop and each of the offset hinge loops of the pair of offset hinge loops define a distance between the hinge loop free end and the bottom face of the conveying body to form a through pass aperture through which a hinge pin having a diameter over at least a part of its length in the range between about 4 mm to about 8 mm held in a hinge receiving space of at least one hinge loop of another module may pass substantially transversely to its axis into or out of the hinge receiving space of the central hinge loop or each of the offset hinge loops of the pair of offset hinge loops.

16. The module according to claim 1, wherein the central hinge loop or each of the offset hinge loops of the pair of offset hinge loops extend within a range of about 45 degrees to about 225 degrees about the through pass aperture.

17. A module for a modular conveyor chain, said module comprising:
a metal link portion including a substantially elongate conveying body having opposing longitudinal sides and a bottom face;
a central hinge loop on one longitudinal side of the conveying body;
a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop or each of the offset hinge loops of the pair of offset hinge loops define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops; and
a retainer facing the through pass aperture, the retainer configured to block the hinge pin held in the hinge receiving space of the at least one hinge loop of the another module and held in the hinge receiving space of the central hinge loop or each of the offset hinge loops of the pair of offset hinge loops from passing transversely to its axis out of the receiving space of the central hinge loop or each of the offset hinge loops of the pair of offset hinge loops.

18. The module according to claim 17, wherein the retainer is an auxiliary element.

19. A module for a modular conveyor chain, said module comprising:
a metal link portion including a substantially elongate conveying body having opposing longitudinal sides and a bottom face;
a central hinge loop on one longitudinal side of the conveying body; and
a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein the central hinge loop and each of the offset hinge loops of the pair of offset hinge loops define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops; and
a retainer facing the through pass aperture, the retainer configured to block a hinge pin held in the hinge receiving space of the at least one hinge loop of the another module and held in the hinge receiving space of the central hinge loop or each of the offset hinge loops of the pair of offset hinge loops from passing transversely to its axis out of the receiving space of the central hinge loop or each of the offset hinge loops of the pair of offset hinge loops.

20. A module for a modular conveyor chain, said module comprising:
- a metal link portion including a substantially elongate conveying body having opposing longitudinal sides and a bottom face;
- a central hinge loop on one longitudinal side of the conveying body; and
- a pair of offset hinge loops on the opposite longitudinal side of the conveying body, said pair of offset hinge loops being interspaced to receive the central hinge loop of a link portion of a consecutive module therebetween, wherein each of the hinge loops of the conveying body extend from the conveying body and loop with their free ends back towards the bottom face of the conveying body around a hinge receiving space, so that consecutive modules can be hingedly coupled by a hinge pin passing axially through aligned hinge receiving spaces of cooperating hinge loops, wherein at least one of the central hinge loop and each of the offset hinge loops of the pair of offset hinge loops are configured to loop through about at least 45 degrees and no greater than about 225 degrees toward the bottom face to define a distance between the hinge loop free end and the bottom face of the conveying body to form a through pass aperture through which a hinge pin held in a hinge receiving space of at least one hinge loop of another module may pass substantially transversely to its axis into or out of the hinge receiving space of the central hinge loop or each of the offset hinge loops of the pair of offset hinge loops.

* * * * *